UNITED STATES PATENT OFFICE.

EARL P. STEVENSON, OF CAMBRIDGE, MASSACHUSETTS, ASSIGNOR TO ARTHUR D. LITTLE, INC., OF CAMBRIDGE, MASSACHUSETTS, A CORPORATION OF MASSACHUSETTS.

METHOD OF MAKING POTASSIUM CARBONATE.

1,360,046.  Specification of Letters Patent.  Patented Nov. 23, 1920.

No Drawing.  Application filed January 19, 1920. Serial No. 352,551.

*To all whom it may concern:*

Be it known that I, EARL P. STEVENSON, a citizen of the United States, residing at Cambridge, in the county of Middlesex and State of Massachusetts, have invented certain new and useful Improvements in Methods of Making Potassium Carbonate; and I do hereby declare the following to be a full, clear, and exact description of the invention, such as will enable others skilled in the art to which it appertains to make and use the same.

The present invention relates to a process for the production of potassium salts and more particularly to such a process employed for the production of potassium carbonate or bicarbonate.

It is recognized by those skilled in the art that potassium carbonate has a certain and definite place in the practical arts, not only because of its use directly in the manufacture of high grade optical glass but as a basis for the preparation of other commercial potassium salts which are widely used in industry.

It is recognized that potassium carbonate may be produced by heating potassium sulfate with carbon and limestone to simultaneously form potassium carbonate together with calcium sulfid as a by-product. This process, however, has certain serious disadvantages; first, because the reaction must take place at high temperatures, and second, because there is no convenient and inexpensive method for disposing of the calcium sulfid which, in itself, is commercially worthless.

The object of the present method is to prepare potassium carbonate or bicarbonate by a comparatively simple and inexpensive process which is free from the objections hereinbefore set forth. This result is attained in part at least by evolving a process which facilitates the conversion of the by-product remaining after the separation of the potassium carbonate into a form which is suitable for further use in a cyclic repetition of the process.

The new process then, for the production of potassium carbonate which constitutes the present invention, consists in treating a solution of potassium acetate in ethyl alcohol with carbon dioxid to form potassium bicarbonate and subsequently treating the alcoholic solution remaining after the separation of the potassium bicarbonate to recover the acetate acid as such or in the form of a salt having low solubility in the alcohol. In the best method of practising the invention now known, the alcoholic solution is treated with lime after the separation of the potassium bicarbonate to form calcium acetate which is substantially insoluble in alcohol and which may be employed for the cyclic repetition of the process.

A further feature of the present invention contemplates the addition of ammonia to the alcoholic solution of potassium acetate in order to neutralize the acetic acid which is formed simultaneously with the potassium bicarbonate and thus prolong the reaction to a greater extent.

The following descriptive outline will serve to indicate to those skilled in the art one manner in which the present invention may be practised commercially. Potassium chlorid (muriate of potash) is treated with sulfuric acid to secure potassium sulfate ($K_2SO_4$). The potassium sulfate thus formed is then treated with calcium acetate to produce insoluble calcium sulfate and soluble potassium acetate. After filtering off the calcium sulfate, the resulting solution of potassium acetate is either evaporated to dryness or concentrated to a high degree. From this anhydrous potassium acetate or concentrated solution of potassium acetate, there is next prepared a solution in ethyl alcohol. This solution is then treated with carbon dioxid gas to produce potassium bicarbonate and acetic acid. The denaturing of the ethyl alcohol, if necessary to comply with the law, does not substantially affect the reaction which takes place when carbon dioxid is added to the alcoholic solution of potassium acetate.

As stated previously, when the solution of potassium acetate is treated with carbon dioxid gas, potassium bicarbonate and acetic acid are simultaneously formed. As alcoholic solutions of acetic acid of a certain strength will dissolve potassium bicarbonate, it is obvious that this reaction between the carbon dioxid and the potassium acetate in the solution cannot proceed indefinitely. In order to prolong the reaction to as great an extent as possible, however, it is desirable to neutralize the acetic acid as it is formed with an alkali. For this purpose, it is found that gaseous ammonia dissolved initially in the alcohol to form an ammoniacal solution or introduced simultaneously with the carbon dioxid will neutralize the acetic acid as it is formed and thus enable the reaction to proceed further than otherwise.

The potassium bicarbonate is readily separated from the alcoholic solution by filtering and may then be converted if so desired to potassium carbonate by a calcining operation.

It is, of course, highly desirable that the acetic acid remaining after the separation of the potassium bicarbonate shall be converted into a form which renders it suitable for further use in the process. To this end, the solution remaining, after the removal of the potassium bicarbonate, is treated with lime which may be slaked or unslaked. The lime decomposes the ammonium acetate in the solution, displacing the ammonia and forming calcium acetate which is precipitated out of the solution. As this calcium acetate is only very slightly soluble in alcohol, it will be precipitated to a very large extent and may be used over again as is evident to prepare further quantities of potassium acetate. The application of heat tends to hasten the reaction between the lime and ammonium acetate, and a subsequent cooling of the solution increases the amount of calcium acetate which may be filtered off.

What is claimed is:

1. A process for making potassium carbonate or bicarbonate which consists in treating a solution of potassium acetate in ethyl alcohol with carbon dioxid to form insoluble potassium bicarbonate and acetic acid, separating the potassium bicarbonate from the solution, and subsequently treating the alcoholic solution with a reagent to produce a salt having low solubility in the alcohol.

2. A process for making potassium carbonate or bicarbonate which consists in treating a solution of potassium acetate in ethyl alcohol with carbon dioxid to form insoluble potassium bicarbonate and acetic acid, separating the potassium bicarbonate from the solution, and subsequently treating the alcoholic solution with lime to convert the acetic acid formed simultaneously with the potassium bicarbonate into calcium acetate, which is substantially insoluble in the alcoholic solution.

3. A process for making potassium carbonate or bicarbonate which consists in treating a solution of potassium acetate in ethyl alcohol with carbon dioxid to produce potassium bicarbonate, adding gaseous ammonia to the solution to prolong the reaction, separating the potassium bicarbonate from the solution, and subsequently treating the solution with lime to form calcium acetate.

4. A process for making potassium carbonate or bicarbonate which consists in treating an alcoholic solution of potassium acetate with carbon dioxid to produce insoluble potassium bicarbonate and acetic acid, separating the potassium bicarbonate from the solution, and subsequently treating the alcoholic solution to recover the acetic acid therefrom.

5. A process for making potassium carbonate or bicarbonate which consists in initially treating potassium chlorid with sulfuric acid to form potassium sulfate, treating the potassium sulfate with calcium acetate to form potassium acetate, separating the potassium acetate from the solution, forming a solution of the potassium acetate in ethyl alcohol, treating the solution with carbon dioxid to produce insoluble potassium bicarbonate and acetic acid, separating the potassium bicarbonate from the alcoholic solution and subsequently treating the alcoholic solution with lime to form insoluble calcium acetate.

6. A process for making potassium carbonate or bicarbonate which consists in treating an ammoniacal alcoholic solution of potassium acetate with carbon dioxid to precipitate insoluble potassium bicarbonate, separating the potassium bicarbonate from the solution, and subsequently treating the solution with a base capable of displacing the ammonia and thereby forming a salt which is substantially insoluble in the alcohol.

EARL P. STEVENSON.